Figure 1:
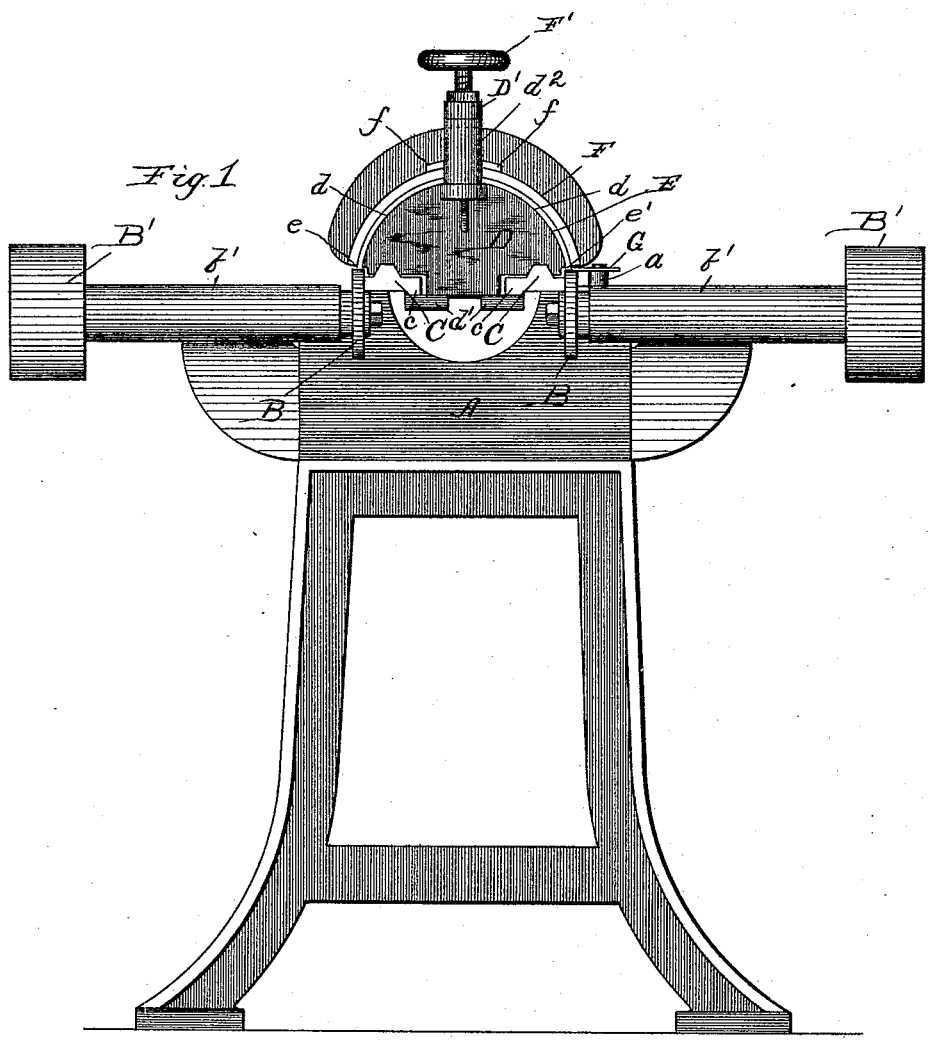

(No Model.) 2 Sheets—Sheet 1.
J. J. CLAUSE.
MACHINE FOR TRIMMING SEGMENTAL CYLINDRICAL STEREOTYPE FORMS.

No. 471,601. Patented Mar. 29, 1892.

Witnesses:
Sew. E. Carts
H. M. Munday,

Inventor:
John J. Clause
By Munday, Evarts & Adcock
His Attorneys.

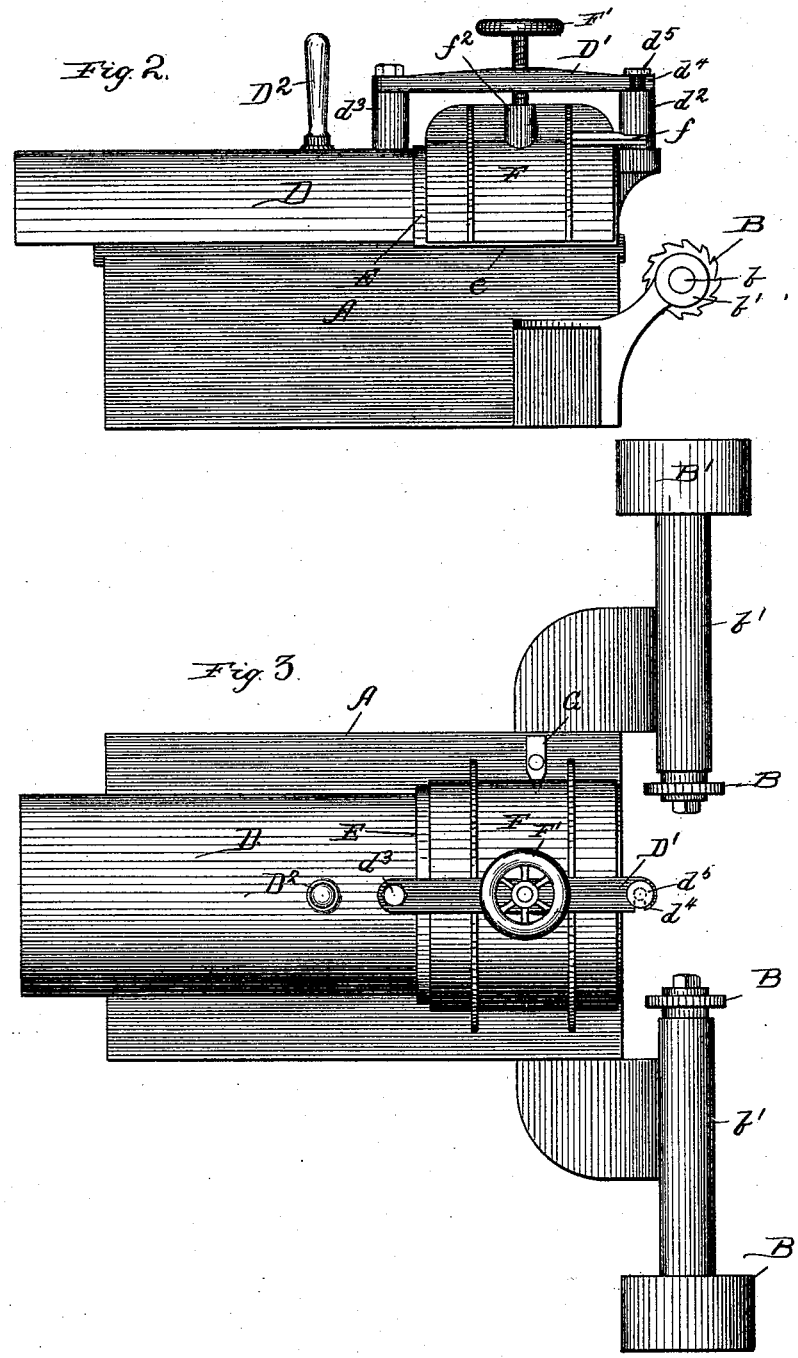

UNITED STATES PATENT OFFICE.

JOHN J. CLAUSE, OF CHICAGO, ILLINOIS.

MACHINE FOR TRIMMING SEGMENTAL CYLINDRICAL STEREOTYPE-FORMS.

SPECIFICATION forming part of Letters Patent No. 471,601, dated March 29, 1892.

Application filed July 16, 1891. Serial No. 399,681. (No model.)

*To all whom it may concern:*

Be it known that I, JOHN J. CLAUSE, a citizen of the United States, residing in Chicago, in the county of Cook and State of Illinois, have invented a new and useful Improvement in Machines for Trimming Segmental Cylindrical Stereotype-Forms, of which the following is a specification.

My invention relates to machines for planing and trimming semi-cylindrical or segmental stereotype-forms to fit the printing-cylinders.

The object of my invention is to provide a machine by which the opposite edges of a semi-cylindrical or segmental form may be cut and trued to fit accurately the segmental space on the printing-cylinder, so that the forms may be properly locked and firmly secured on the cylinder.

My machine comprises a pair of rotary cutters, with which the opposite edges of the segmental plate or form may be brought in contact, a reciprocating slide furnished with a segmental form to receive the stereotype-plate, a segmental clamp for securing the stereotype-plate, a gage for the marginal shoulder of the stereotype-plate to abut against, so that it may be fixed in proper position on the slide, and a guideway on the frame of the machine, in which the slide reciprocates.

In the accompanying drawings, which form a part of this specification, and in which similar letters of reference indicate like parts, I have shown at Figure 1 an end view of a machine embodying my invention; at Fig. 2, a side view, and at Fig. 3 a plan view.

In the drawings, A represents the frame of the machine.

B B are a pair of revolving cutters or planers, the shafts $b$ of which are journaled in suitable bearings $b'$ on the frame and furnished with pulleys B' for revolving the same.

C C are guideways on the frame upon which reciprocates the slide D, which is furnished with a form or holder $d$ of segmental cylindrical shape corresponding in diameter to that of the segmental cylindrical stereotype plate or form E, the edges $e$ of which are to be trimmed. The slide D is furnished with gibs $d'$, which fit under the projecting edges $c$ of the guide C, so as to cause the slide to reciprocate truly in a right line and to prevent the same giving under the upward pressure produced by the cutters B when in action.

F is a segmental cylindrical clamp corresponding in shape to the outer periphery of the stereotype-plate E and by which said plate is securely clamped and held on the holder or form $d$ of the slide D. To center the clamp with the holder $d$ and slide D, I provide the same with a fork or guide $f$, which embraces a post or projection $d^2$ on the slide D. The clamp F is operated or compressed by a hand-screw F', which is threaded in the clamp-bar D', pivotally secured at one end to the post $d^3$ on the slide D and having at its opposite end a slot or hook $d^4$, which fits under the headed pin or bolt $d^5$, secured in the post $d^2$. The end of the screw F' fits in a socket $f^2$ in the clamp F. By loosening the screw F' and withdrawing its end from the socket $f^2$ in the clamp F the clamp-bar D' may be swung on its pivot $d^3$ from over the clamp F, and thus permit the ready removal of the clamp and of the stereotype-plate E. The slide D is provided with a handle $D^2$, by which the same may be reciprocated back and forth to bring the edges of the plate E in contact with the cutters B.

G is a gage secured to the post $a$ on the frame of the machine, and against which the shouldered edge $e'$ of the stereotype-plate E abuts, and by which the position of the segmental plate E is adjusted and fixed in respect to the holder $d$ and cutters B B. The forms or plates E to be trimmed are usually of a somewhat smaller segment than a half-cylinder, as a printing-cylinder ordinarily has a stop plate or rib against which the adjoining edges of the stereotype-segments abut.

I claim—

1. The combination, in a machine for trimming and truing the edges of segmental cylindrical stereotype-plates, of a frame A, a pair of rotary cutters B B, a guideway C on the frame, a reciprocating slide D, having a segmental cylindrical form or holder $d$, a segmental cylindrical clamp F, and a gage G for the shouldered edge of the stereotype-plate to abut against, said slide D having posts $d^2$ $d^3$, and said clamp F having a centering-guide $f$, a hand-screw F', and a clamping-bar D', substantially as specified.

2. In a stereotype-plate-trimming machine, the combination, with a pair of rotary cutters B B, of a reciprocating slide D, furnished with a segmental form $d$, and a segmental clamp F for securing the segmental stereotype to said slide, substantially as specified.

3. In a stereotype-plate-trimming machine, the combination, with a pair of rotary cutters B B, of a reciprocating slide D, furnished with a segmental form $d$, and a segmental clamp F for securing the segmental stereotype to said slide, and a gage G for adjusting the position of said plate in relation to said cutters, substantially as specified.

4. In a stereotype-plate-trimming machine, the combination, with a pair of rotary cutters B B, of a reciprocating slide D, furnished with a segmental form $d$, and a segmental clamp F for securing the segmental stereotype to said slide, said slide being provided with a swinging clamping-bar D′, furnished with a hand-screw F′, substantially as specified.

5. In a stereotype-plate-trimming machine, the combination, with a pair of rotary cutters B B, of a reciprocating slide D, furnished with a segmental form $d$, and a segmental clamp F for securing the segmental stereotype to said slide, said clamp F having a centering device $f$ and said slide D having a post or projection for said centering-guide $f$ to abut against, substantially as specified.

6. In a stereotype-plate-trimming machine, the combination, with a pair of rotary cutters B B, of a reciprocating slide D, furnished with a segmental form $d$, and a segmental clamp F for securing the segmental stereotype to said slide, and a gage G for adjusting the position of said plate in relation to said cutters, said slide D having posts $d^2 d^3$, clamping-bar D′, pivoted to one of said posts and having a hook or slot engaging the other, and a hand-screw F′, substantially as specified.

JOHN J. CLAUSE.

Witnesses:
 EDMUND ADCOCK,
 H. M. MUNDAY.